(12) United States Patent
Baldys et al.

(10) Patent No.: US 10,406,960 B2
(45) Date of Patent: Sep. 10, 2019

(54) METHOD AND SYSTEM FOR OPERATING A TIPPER VEHICLE

(71) Applicant: HYVA HOLDING B.V., Alphen aan den Rijn (NL)

(72) Inventors: Marek Baldys, Amsterdam (NL); Maarten Hertog, Utrecht (NL); Jacob Biemond, Bodegraven (NL)

(73) Assignee: HYVA HOLDING B.V. (NL)

( * ) Notice: Subject to any disclaimer, the term of this patent is extended or adjusted under 35 U.S.C. 154(b) by 0 days.

(21) Appl. No.: 15/556,035

(22) PCT Filed: Feb. 26, 2016

(86) PCT No.: PCT/EP2016/054175
§ 371 (c)(1),
(2) Date: Sep. 6, 2017

(87) PCT Pub. No.: WO2016/142196
PCT Pub. Date: Sep. 15, 2016

(65) Prior Publication Data
US 2018/0111537 A1    Apr. 26, 2018

(30) Foreign Application Priority Data
Mar. 6, 2015    (GB) .................................. 1503874.8

(51) Int. Cl.
*B60P 1/00*    (2006.01)
*B60P 1/16*    (2006.01)
(Continued)

(52) U.S. Cl.
CPC .............. *B60P 1/162* (2013.01); *B60P 1/045* (2013.01); *B60P 1/283* (2013.01); *B60W 2300/125* (2013.01)

(58) Field of Classification Search
None
See application file for complete search history.

(56) References Cited

U.S. PATENT DOCUMENTS 3,966,254 A * 6/1976 Guhl ...................... B60K 28/00
                                                          298/22 C
4,145,682 A * 3/1979 Cook .................. B60R 16/0233
                                                          180/282
(Continued)

FOREIGN PATENT DOCUMENTS

| EP | 2781403 A2 | 9/2014 |
| JP | H08268136 A | 10/1996 |
| JP | 2009166669 A | 7/2009 |

OTHER PUBLICATIONS

Search Report and Written Opinion for application No. PCT/EP2016/054175 filed Feb. 26, 2016 (12 pages).

*Primary Examiner* — Jonathan M Dager (57) ABSTRACT

There is disclosed a method of operating a tipper vehicle, the tipper vehicle comprising a tipper body pivotably moveable with respect to a frame with a hydraulic cylinder disposed therebetween and actuatable to pivot the tipper body. The method comprises monitoring at least one of (i) a pressure parameter relating to the hydraulic pressure within the hydraulic cylinder and (ii) an angular positional parameter relating to the angular position of the tipper body; determining a maximum permissible vehicle speed based on at least one of the monitored (i) pressure parameter and (ii) angular positional parameter; and displaying the maximum permissible vehicle speed.

14 Claims, 7 Drawing Sheets

(51) Int. Cl.
   *B60P 1/04*      (2006.01)
   *B60P 1/28*      (2006.01)

(56) References Cited

U.S. PATENT DOCUMENTS

| | | | |
|---|---|---|---|
| 4,988,974 A | 1/1991 | Fury et al. | |
| 5,020,857 A * | 6/1991 | Bertelson | B60P 1/162 298/22 C |
| 5,327,347 A * | 7/1994 | Hagenbuch | G01G 19/08 701/29.4 |
| 5,742,228 A * | 4/1998 | Levy | B60P 1/045 180/282 |
| 6,302,491 B1 * | 10/2001 | Anderson | B60P 1/26 298/23 M |
| 7,591,513 B2 * | 9/2009 | Morley | B60P 1/26 298/23 MD |
| 7,810,887 B2 * | 10/2010 | Hjerth | B60P 1/045 298/17 S |
| 8,267,480 B2 * | 9/2012 | Kvist | B60P 1/283 298/19 R |
| 8,700,274 B1 | 4/2014 | Tejeda et al. | |
| 8,818,699 B2 * | 8/2014 | Nichols | B62D 53/0871 280/400 |
| 8,840,189 B2 * | 9/2014 | Minoshima | B60P 1/162 298/22 R |
| 9,174,562 B2 * | 11/2015 | Uozu | B60P 1/162 |
| 9,738,202 B2 * | 8/2017 | Humphrey | B60P 1/283 |
| 9,796,392 B2 * | 10/2017 | Lambert | B60P 1/045 |
| 9,802,524 B2 * | 10/2017 | Anderson | B60P 1/045 |
| 9,803,324 B2 * | 10/2017 | Kean | E01C 19/201 |
| 9,845,039 B2 * | 12/2017 | Anderson | B60P 1/16 |
| 9,937,844 B2 * | 4/2018 | Cronholm | B60P 1/283 |
| 2002/0047300 A1 * | 4/2002 | Uematsu | B60P 1/162 298/22 R |
| 2006/0002762 A1 * | 1/2006 | Crampton | E01C 19/15 404/110 |
| 2008/0303336 A1 * | 12/2008 | Whitfield | B60W 10/184 298/17 R |
| 2009/0084257 A1 * | 4/2009 | Buckley | F15B 15/222 91/403 |
| 2010/0026079 A1 * | 2/2010 | Nabeshima | B60P 1/162 298/17 R |
| 2010/0084908 A1 * | 4/2010 | Montocchio | B60P 1/283 298/22 C |
| 2011/0153154 A1 * | 6/2011 | Hagenbuch | G07C 5/008 701/33.4 |
| 2012/0205169 A1 * | 8/2012 | Montocchio | B60T 10/02 180/54.1 |
| 2012/0205178 A1 * | 8/2012 | Heine | B60W 10/06 180/282 |
| 2014/0159466 A1 * | 6/2014 | Minoshima | B60P 1/283 298/22 C |
| 2014/0222299 A1 * | 8/2014 | Stander | B60P 1/04 701/50 |
| 2014/0222303 A1 * | 8/2014 | Chary | B60P 1/283 701/50 |
| 2014/0336883 A1 * | 11/2014 | Thompson | B60P 1/045 701/50 |
| 2016/0090089 A1 * | 3/2016 | Ichinose | B60T 7/18 701/99 |
| 2016/0137116 A1 * | 5/2016 | Chary | B60P 1/16 701/49 |
| 2016/0217398 A1 * | 7/2016 | Unuma | G06Q 50/30 |
| 2016/0257236 A1 * | 9/2016 | Baldys | B60P 1/162 |
| 2016/0258452 A1 * | 9/2016 | Baldys | F15B 19/005 |
| 2017/0021751 A1 * | 1/2017 | Baldys | B60P 1/045 |
| 2018/0056841 A1 * | 3/2018 | Baldys | B60P 1/162 |
| 2018/0065533 A1 * | 3/2018 | Hertog | B60P 1/045 |
| 2018/0276902 A1 * | 9/2018 | Baldys | G07C 5/006 |
| 2018/0281656 A1 * | 10/2018 | Osagawa | B60P 1/162 |

\* cited by examiner

METHOD AND SYSTEM FOR OPERATING A TIPPER VEHICLE

FIELD

The invention relates to a method and system for operating a tipper. In particular, the invention relates to determining whether the vehicle speed is excessive.

BACKGROUND

A tipper truck, sometimes referred to as a dump or dumper truck, is a vehicle that is typically used in the construction industry for transporting aggregate (e.g. gravel or sand). The tipper typically comprises an engine, a driver cab and a trailer. The trailer usually has a trailer chassis or frame with a tipper body, in the form of an open-top cuboidal container, pivotably mounted thereto. A hydraulic cylinder is provided between the frame and the tipper body and can be extended to pivot the tipper body to a tipping position in which the load is emptied from the body. The cylinder can be retracted to lower the tipper body. It should be appreciated that this is merely one form of tipper truck and other types do exist.

In use, as the tipper body is moved from a resting position to a fully tipped tipping position the load (such as aggregate) is progressively emptied from the tipper body. In order to completely empty the tipper body it may be necessary for the operator to slowly drive the tipper truck forwards. However, if the vehicle is driven too fast, or if the operator accidentally leaves the tipper body in the tipped position, there is a risk that the tipper truck may topple over. This is clearly highly undesirable.

SUMMARY

It is therefore desirable to provide a method and system which addresses this problem to at least some extent.

According to an aspect there is provided a method of operating a tipper vehicle, the tipper vehicle comprising a tipper body pivotably moveable with respect to a frame with a hydraulic cylinder disposed therebetween and actuatable to pivot the tipper body, the method comprising: monitoring at least one of (i) a pressure parameter relating to the hydraulic pressure within the hydraulic cylinder and (ii) an angular positional parameter relating to the angular position of the tipper body; and determining a maximum permissible vehicle speed based on at least one of the monitored (i) pressure parameter and (ii) angular positional parameter. The method may comprise displaying the maximum permissible vehicle speed.

The term "angular positional parameter" covers any measurable parameter from which the angular position and/or tip angle of the tipper body can be determined. Thus the angular positional parameter does not have to be generated by directly measuring the angular position of the tipper body. For example, the angular positional parameter could be generated by measuring another factor such as the inclination angle of the hydraulic cylinder, the length of the hydraulic cylinder, or the vertical distance between the frame and the lower surface of the tipper body.

The term "pressure parameter" covers any measurable parameter from which the pressure of the hydraulic fluid within the hydraulic cylinder can be determined.

The method may comprise monitoring both the pressure parameter and the angular positional parameter, and determining the maximum permissible vehicle speed based on at least the monitored pressure parameter and angular positional parameter.

The pressure parameter may be generated by a pressure sensor which measures the hydraulic pressure within the hydraulic cylinder. The pressure sensor may be mounted to the hydraulic cylinder. The pressure sensor could be mounted within a port provided in the hydraulic cylinder. In other embodiments the pressure sensor may be provided within a fluid line connected to the hydraulic cylinder. The pressure sensor could be an electronic pressure arranged to generate an electronic pressure signal, the value of which is related to the hydraulic pressure within the hydraulic cylinder.

The angular positional parameter may be generated by an inclination sensor. The inclination sensor may measure the inclination of the hydraulic cylinder. The inclination sensor may be mounted to the hydraulic cylinder. The inclination sensor may measure the inclination of the hydraulic cylinder in a plane perpendicular to the pivot axis of the cylinder (i.e. the fore-aft inclination). The inclination sensor may measure the inclination of the tipper body. The inclination sensor may be mounted to the tipper body. The angular positional parameter may be generated by a rotary position sensor. The rotary position sensor may measure the angular position of the hydraulic cylinder about a pivot axis of the hydraulic cylinder. The rotary position sensor may measure the angular position of the tipper body about the pivot axis of the hydraulic cylinder. The rotary position sensor may measure the angular position of the tipper body about the pivot axis of the hydraulic cylinder. The position sensor, such an inclination (or tilt) sensor or a rotary position sensor, may be electronic and may be arranged to generate an electronic signal, the value of which is related to the angular position of the tipper body.

Determining the maximum permissible vehicle speed may comprise utilising an algorithm.

The method may further comprise receiving the vehicle speed. The method may further comprise generating an alert if it is determined that the received vehicle speed is greater than the determined maximum permissible vehicle speed. The vehicle speed may be received from an engine controller of the vehicle. The vehicle speed may be determined using at least one of a motion sensor, such as an accelerometer or an inertial measurement unit; a satellite navigation receiver; a drive shaft speed senor which measures the rotational speed of a drive shaft of the vehicle. The motion sensor may be mounted to the hydraulic cylinder. The alert may comprise a visual and/or an audible alert.

The method may further comprise lowering the tipper body towards the resting position if it is determined that the vehicle speed is greater than the maximum permissible vehicle speed.

According to another aspect there is provided a system for a tipper vehicle, the tipper vehicle comprising a tipper body pivotably moveable with respect to a frame with a hydraulic cylinder disposed therebetween and actuatable to pivot the tipper body, the system comprising: a tipper body monitoring module arranged to monitor at least one of (i) a pressure parameter relating to the hydraulic pressure within the hydraulic cylinder and (ii) an angular positional parameter relating to the angular position of the tipper body; and a maximum permissible vehicle speed determining module arranged to determine the maximum permissible vehicle speed based on at least one of the monitored (i) pressure parameter and (ii) angular positional parameter. The system may further comprise a display arranged to display the maximum permissible vehicle speed.

The tipper body monitoring module may be arranged to monitor both the pressure parameter and the angular positional parameter. The maximum permissible vehicle speed determining module may be arranged to determine the maximum permissible vehicle speed based on at least the monitored pressure parameter and angular positional parameter.

The system may further comprise a pressure sensor arranged to measure the hydraulic pressure within the hydraulic cylinder and arranged to generate the pressure parameter.

The system may further comprise an inclination sensor arranged to generate the angular positional parameter. The inclination sensor may be arranged to measure the inclination of the hydraulic cylinder. The inclination sensor may be arranged to measure the inclination of the tipper body. The system may further comprise a rotary position sensor arranged to generate the angular positional parameter. The rotary position sensor may be arranged to measure the angular position of the hydraulic cylinder about a pivot axis of the hydraulic cylinder. The rotary position sensor may be arranged to measure the angular position of the tipper body about the pivot axis of the hydraulic cylinder.

The maximum permissible vehicle speed determining module may be arranged to determine the maximum permissible vehicle speed utilising an algorithm.

The system may further comprise a vehicle speed monitoring module is arranged to monitor the vehicle speed. The system may further comprise an alert generator arranged to generate an alert if it is determined that the vehicle speed is greater than the determined maximum permissible vehicle speed. The vehicle speed monitoring module may be arranged to be connected to an engine controller of the vehicle such that it can receive the vehicle speed from the engine controller. The vehicle speed monitoring module may be arranged to determine the vehicle speed using at least one of: a motion sensor, such as an accelerometer or an inertial measurement unit; a satellite navigation receiver; and a drive shaft speed senor arranged to measure the rotational speed of a drive shaft of the vehicle. The alert generator may comprise a visual and/or an audible alert generator.

The system may further comprise a hydraulic cylinder control module arranged to actuate the hydraulic cylinder to lower the tipper body towards the resting position if it is determined that the vehicle speed is greater than the maximum permissible vehicle speed.

According to an aspect there is provided a method of operating a tipper vehicle, the tipper vehicle comprising a tipper body pivotably moveable with respect to a frame with a hydraulic cylinder disposed therebetween and actuatable to pivot the tipper body, the method comprising: monitoring a vehicle speed parameter relating to the current speed of the vehicle; monitoring at least one of (i) a pressure parameter relating to the hydraulic pressure within the hydraulic cylinder and (ii) an angular positional parameter relating to the angular position of the tipper body; determining whether the vehicle speed is excessive based on the at least the monitored vehicle speed parameter and at least one of the monitored (i) pressure parameter and (ii) angular positional parameter; and generating an output if it is determined that the vehicle speed is excessive. The method may thus prevent or alert an operator if the vehicle speed is excessive for the particular conditions of the tipper body and/or tipper body weight.

The method may comprise monitoring both the pressure parameter and the angular positional parameter, and determining whether the vehicle speed is excessive based on the at least the monitored vehicle speed parameter, and the monitored pressure parameter and angular positional parameter.

The pressure parameter may be generated by a pressure sensor which measures the hydraulic pressure within the hydraulic cylinder. The pressure sensor may be mounted to the hydraulic cylinder. The pressure sensor could be mounted within a port provided in the hydraulic cylinder. In other embodiments the pressure sensor may be provided within a fluid line connected to the hydraulic cylinder. The pressure sensor could be an electronic pressure arranged to generate an electronic pressure signal, the value of which is related to the hydraulic pressure within the hydraulic cylinder.

The angular positional parameter may be generated by an inclination sensor. The inclination sensor may measure the inclination of the hydraulic cylinder. The inclination sensor may be mounted to the hydraulic cylinder. The inclination sensor may measure the inclination of the hydraulic cylinder in a plane perpendicular to the pivot axis of the cylinder (i.e. the fore-aft inclination). The inclination sensor may measure the inclination of the tipper body. The inclination sensor may be mounted to the tipper body. The angular positional parameter may be generated by a rotary position sensor. The rotary position sensor may measure the angular position of the hydraulic cylinder about a pivot axis of the hydraulic cylinder. The rotary position sensor may measure the angular position of the tipper body about the pivot axis of the hydraulic cylinder. The position sensor, such an inclination (or tilt) sensor or a rotary position sensor, may be electronic and may be arranged to generate an electronic signal, the value of which is related to the angular position of the tipper body.

The vehicle speed parameter may be received from an engine controller of the vehicle. This may be obtained from the CAN bus. The vehicle speed parameter may be generated by: a motion sensor, such as an accelerometer or an inertial measurement unit, or a drive shaft speed senor (e.g. an inductive sensor) which measures the rotational speed of a drive shaft of the vehicle. The motion sensor may be mounted to the hydraulic cylinder.

Determining whether the vehicle speed is excessive may comprise utilising an algorithm. Determining whether the vehicle speed is excessive may comprise comparing the vehicle speed parameter with reference data. The comparison may be a direct comparison or an indirect comparison. For example, the vehicle speed parameter could be converted into another form before comparison (e.g. a speed in mph or km/h). The method may further comprise generating an alert if it is determined that the vehicle speed is excessive. The alert may comprise a visual and/or an audible alert. The method may further comprise lowering the tipper body towards the resting position if it is determined that the vehicle speed is excessive.

According to another aspect there is provided a system for a tipper vehicle, the tipper vehicle comprising a tipper body pivotably moveable with respect to a frame with a hydraulic cylinder disposed therebetween and actuatable to pivot the tipper body, the system comprising: a vehicle speed monitoring module arranged to monitor a vehicle speed parameter relating to the current speed of the vehicle; a tipper body monitoring module arranged to monitor at least one of (i) a pressure parameter relating to the hydraulic pressure within the hydraulic cylinder and (ii) an angular positional parameter relating to the angular position of the tipper body; an excessive speed determining module arranged to: determine whether the vehicle speed is excessive based on the at least the monitored vehicle speed parameter and at least one of the monitored (i) pressure parameter and (ii) angular positional parameter; and generate an output if it is determined that the vehicle speed is excessive.

The tipper body monitoring module may be arranged to monitor both the pressure parameter and the angular positional parameter. The excessive speed determining module may be arranged to determine whether the vehicle speed is excessive based on the at least the monitored vehicle speed parameter, and the monitored pressure parameter and angular positional parameter.

The system may further comprise a pressure sensor arranged to measure the hydraulic pressure within the hydraulic cylinder and arranged to generate the pressure parameter. The system may further comprise an inclination sensor arranged to generate the angular positional parameter. The inclination sensor may be arranged to measure the inclination of the hydraulic cylinder. The inclination sensor may measure the inclination of the tipper body. The system may further comprise rotary position sensor arranged to generate the angular positional parameter. The rotary position sensor may be arranged to measure the angular position of the hydraulic cylinder about a pivot axis of the hydraulic cylinder. The rotary position sensor may be arranged to measure the angular position of the tipper body about the pivot axis of the hydraulic cylinder.

The vehicle speed monitoring module may be arranged to be connected to an engine controller of the vehicle such that it can receive the vehicle speed parameter from the engine controller.

The system may further comprise a motion sensor, such as an accelerometer or an inertial measurement unit, arranged to generate the vehicle speed parameter; or a drive shaft speed senor arranged to measure the rotational speed of a drive shaft of the vehicle.

The excessive speed determining module may be arranged to determine whether the vehicle speed is excessive comprises utilising an algorithm. The system may further comprise a storage module storing reference data. The excessive speed determining module may be arranged to determine whether the vehicle speed is excessive comprises comparing the vehicle speed parameter with reference data stored in the storage module. The system may further comprise an alert generator arranged to generate an alert if it is determined that the vehicle speed is excessive. The alert generator may comprise a visual and/or an audible alert generator. The system may further comprise a hydraulic cylinder control module arranged to actuate the hydraulic cylinder to lower the tipper body towards the resting position if it is determined that the vehicle speed is excessive.

According to a further aspect there is provided a tipper vehicle comprising: a tipper body pivotably moveable with respect to a frame; a hydraulic cylinder disposed between the frame and the tipper body and actuatable to pivot the tipper body; and a system in accordance with any statement herein. The pressure sensor may be mounted to the hydraulic cylinder. The inclination sensor may be mounted to the hydraulic cylinder. The inclination sensor may be mounted to the tipper body. The motion sensor may be mounted to the hydraulic cylinder.

According to yet a further aspect there is provided a hydraulic cylinder assembly comprising: a hydraulic cylinder having at least one pivot axis perpendicular to the longitudinal axis of the cylinder; and at least one inclination sensor coupled to the hydraulic cylinder such that it is capable of generating a fore-aft inclination parameter relating to the inclination of the cylinder in a plane perpendicular to the pivot axis. The hydraulic cylinder assembly may further comprise a motion sensor, such as an accelerometer or an inertial measurement unit, coupled to the hydraulic cylinder and capable of generating a speed parameter.

According to yet a further aspect there is provided a hydraulic cylinder assembly comprising: a hydraulic cylinder having at least one pivot axis perpendicular to the longitudinal axis of the cylinder; and a motion sensor, such as an accelerometer or an inertial measurement unit, coupled to the hydraulic cylinder and capable of generating a speed parameter. The hydraulic cylinder assembly may further comprise at least one inclination sensor coupled to the hydraulic cylinder such that it is capable of generating a fore-aft inclination parameter relating to the inclination of the cylinder in a plane perpendicular to the pivot axis.

At least one end of the hydraulic cylinder is provided with an eye which defines the pivot axis. The hydraulic cylinder assembly may further comprise a pressure sensor coupled to the hydraulic cylinder such that it is capable of generating a pressure parameter relating to the hydraulic pressure within the hydraulic cylinder.

The invention may comprise any combination of the features and/or limitations referred to herein, except combinations of such features as are mutually exclusive.

BRIEF DECRIPTION OF THE FIGURES

Embodiments of the invention will now be described, by way of example, with reference to the accompanying drawings, in which.

DETAILED DESCRIPTION

Figure 1:
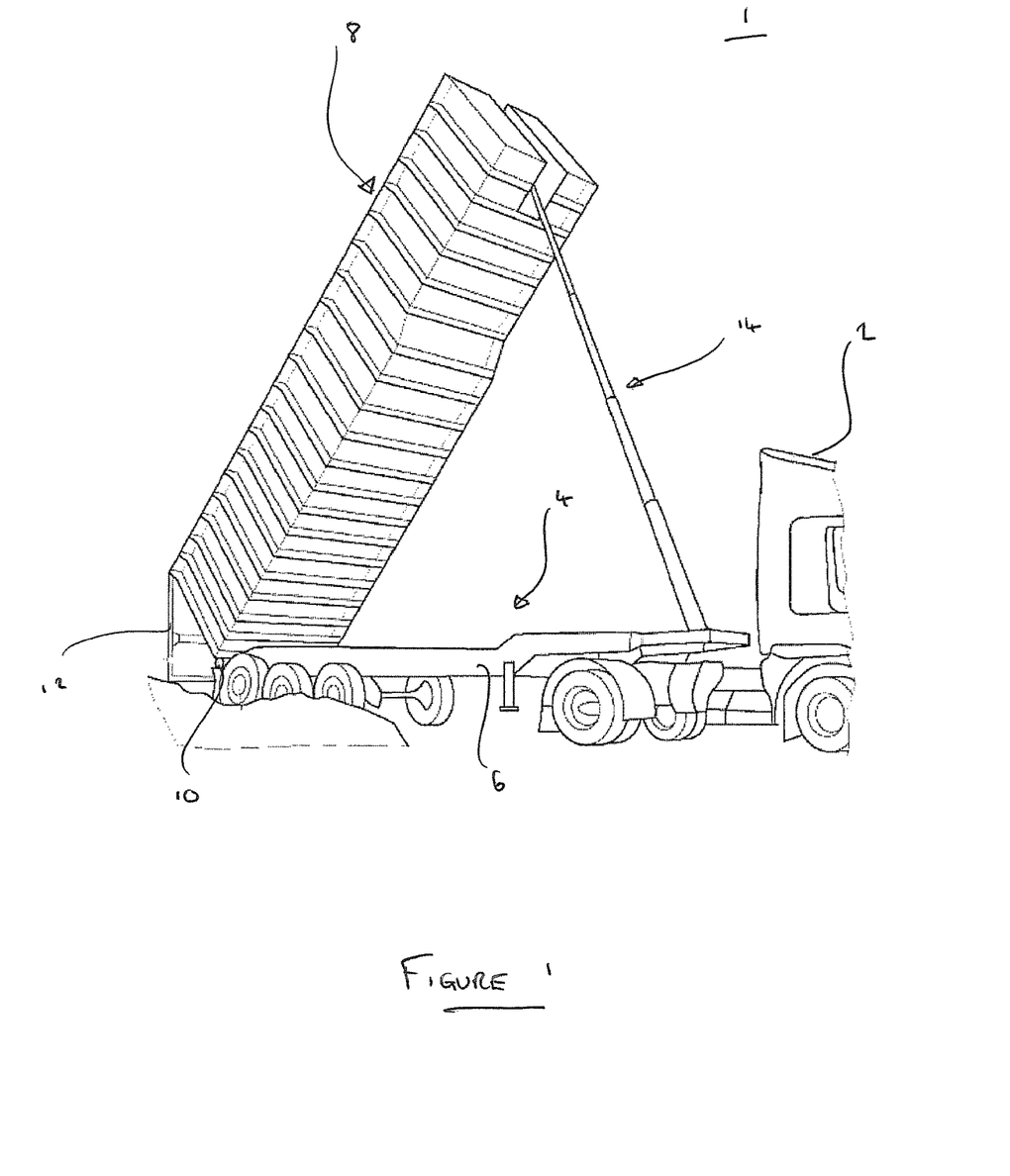
FIG. 1 schematically shows a perspective view of a tipper truck.
Figure 2:
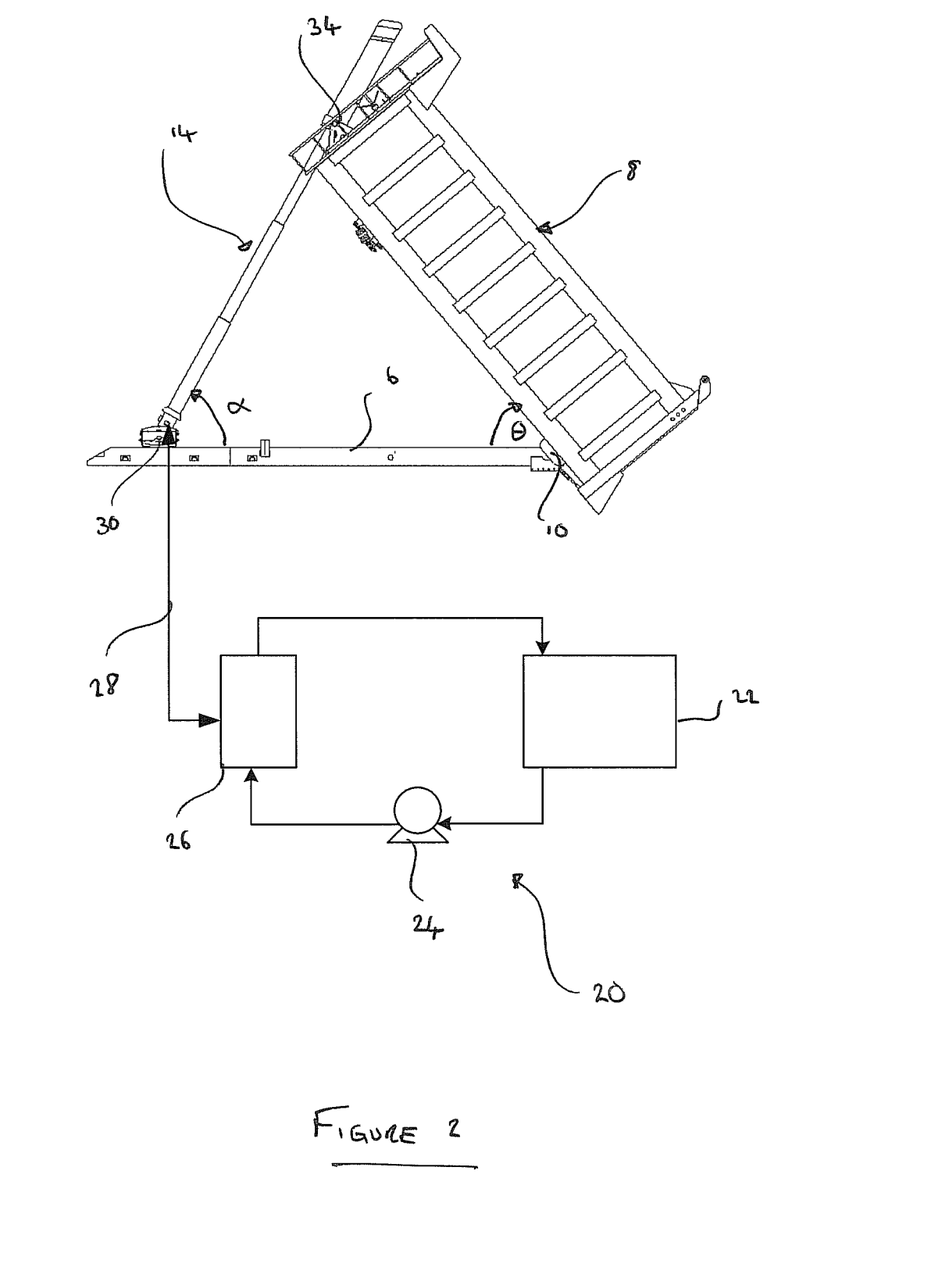
FIG. 2 schematically shows a side view of the tipper truck of FIG. 1 without the tractor.

FIGS. 1 and 2 show a tipper truck 1, sometimes referred to as a dump truck, comprising a tractor 2 and a trailer 4. The trailer 4 has a trailer chassis or frame 6, and a tipper body 8 is pivotably mounted thereto. The tipper body 8 is pivotably mounted to the chassis 6 about a transverse axis 10 that is located at the rear of the chassis 6. The tipper body 8 is in the form of a cuboidal container having an open top. The rear panel (or door) 12 of the tipper body 8 is hinged at its upper edge and can be locked and unlocked such that it can be opened to allow the contents of the tipper body 8 to be emptied. A hydraulic cylinder 14 is provided that is pivotably attached at a lower end to the front of the chassis 6 and pivotably attached an upper end to the front of the tipper body 8. The hydraulic cylinder 14 can be extended (as in FIG. 1) to pivot the tipper body 8 about the axis 10 to a fully tipped position in which, with the rear panel 12 unlocked, any load within the tipper body 8 is emptied onto the ground. The tipper body 8 can be lowered back to the resting position under its own weight, thereby causing the cylinder 14 to retract. Since the lower end of the hydraulic cylinder 14 is pivotably fixed to the chassis 6 and the upper end of the hydraulic cylinder 14 is pivotably fixed to the tipper body 8, there is a fixed relationship between the inclination angle α of the cylinder 14 relative to the chassis, and the tip angle θ of the tipper body 8 relative to the chassis 6.

The tipper truck 1 further comprises a hydraulic actuation system 20 for actuating the hydraulic cylinder 14. The hydraulic actuation system 20 comprises an oil tank 22, a pump 24 and a valve assembly 26 that are connected with fluid lines to form a fluid circuit. A pilot system (not shown) is also provided for switching the valve assembly between various configurations. The valve assembly 26 is provided with a port that is hydraulically connected to the hydraulic cylinder 14 with a fluid line 28. The valve assembly 26 can be switched between a number of configurations in order to operate the hydraulic cylinder 14. In a bypass configuration of the valve assembly 26, with the pump 24 running, hydraulic fluid is circulated by the pump 24 from the tank 22, through the valve assembly 26 back to the tank 22. In order to extend the hydraulic cylinder 14 to pivot the tipper body 8 to a fully tipped position (as in FIGS. 1 and 2), the valve assembly 26 is switched to a raising configuration in which the pump 24 pumps hydraulic fluid from the tank 22 into the hydraulic cylinder 14, thus causing it to extend. When the hydraulic cylinder 14 has been sufficiently extended (either fully extended or extended by the desired amount), the valve assembly 26 is returned to a bypass configuration in which, with the pump 24 running, hydraulic fluid is circulated from the tank 22 through the valve assembly 26 back to the tank 22. In the bypass configuration of the valve assembly 26 the fluid line 28 is closed and therefore the cylinder 14 remains in the extended configuration. In this embodiment, the hydraulic actuation system 20 is provided with an automatic knock-off which automatically switches the valve assembly 26 to the bypass configuration when the hydraulic cylinder has been fully extended. The automatic knock-off is in the form of a switch which the body of the hydraulic cylinder 14 triggers when it reaches the fully extended position. The valve assembly 26 is also provided with a pressure relief bypass valve. If the pressure of the hydraulic fluid in the valve assembly 26 exceeds a threshold (which may be due to an excessively heavy load in the tipper body 8) the hydraulic fluid is diverted to the tank 22, rather than being pumped into the hydraulic cylinder 14. This is a safety feature provided to prevent excessively heavy loads from being lifted. In order to lower the hydraulic cylinder 14, the pump 24 is shut off and the valve assembly 26 is switched to a lowering configuration. In this configuration, the fluid line 28 is opened and the cylinder 14 retracts under the weight of the tipper body 8 with the hydraulic fluid being returned to the tank 22.

If the tipper truck 1 is driven with the tipper body 8 raised (i.e. pivoted away from the resting position) then this could present a safety hazard. As will be described in detail below, the tipper truck 1 is provided with a speed warning system 40 which generates an alert if the vehicle speed is too high for the given conditions of the tipper.

Figure 3:
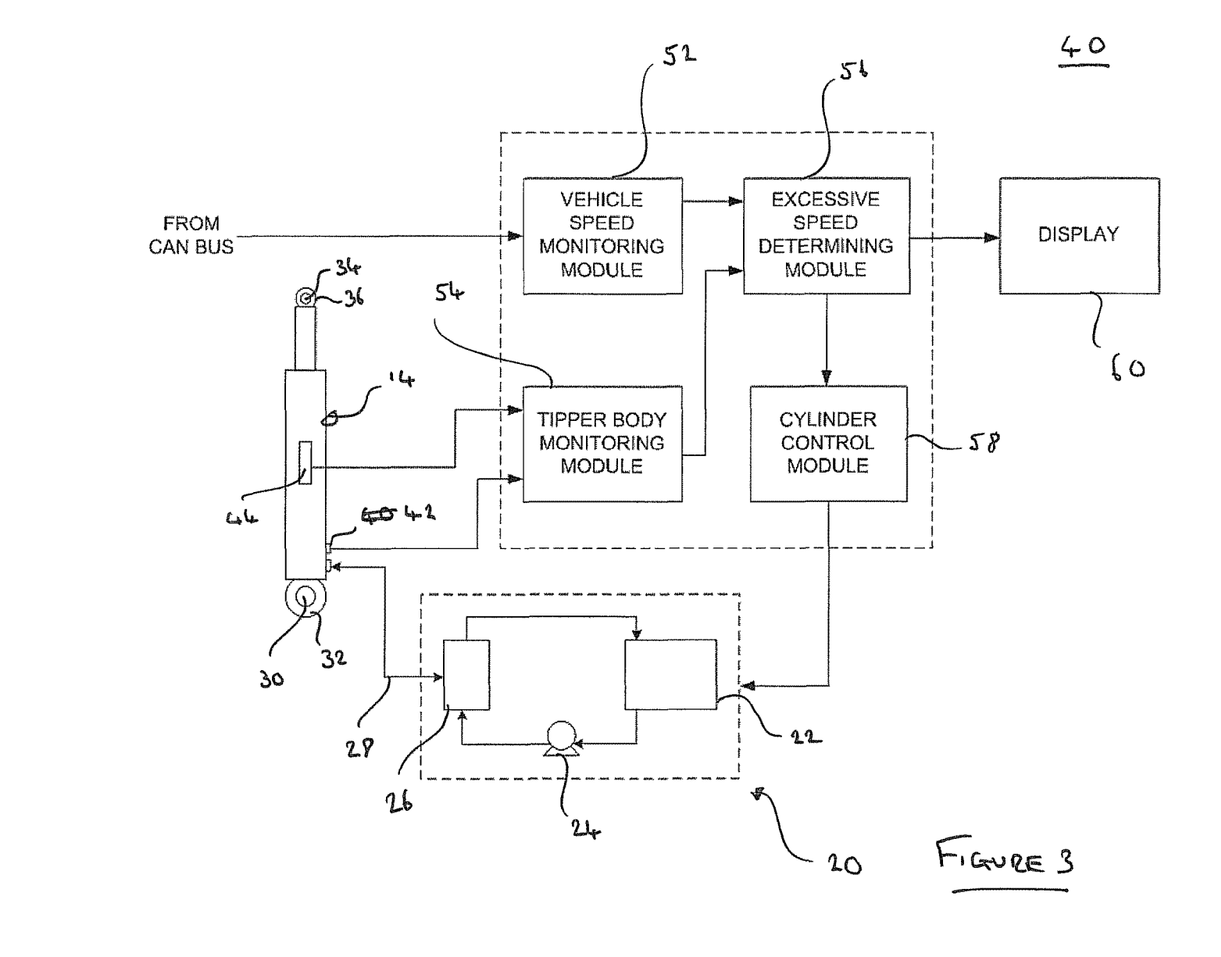
FIG. 3 schematically shows a first embodiment of a speed warning system for the tipper truck.

FIG. 3 shows the speed warning system 40 for generating a speed warning. The speed warning system 40 comprises a pressure sensor 42 for measuring the pressure of the hydraulic fluid, such as oil, within the hydraulic cylinder 14 and an inclination (or tilt) sensor 44 for measuring the inclination (i.e. the tilt angle) of the hydraulic cylinder 14 in a plane perpendicular to the lower pivot axis 30. The lower pivot axis 30 of the cylinder 14 is defined by the axis of the eye 32 by which the cylinder 14 is pivotably mounted to the chassis 6. Similarly, the upper pivot axis 34 (which is parallel to the lower axis 30) is defined by the axis of the eye 36 by which the cylinder 14 is pivotably mounted to the tipper body 8. The pressure sensor 42 is an electronic pressure transducer that is installed within a port provided in the outer wall of the cylinder 14. The pressure sensor 42 is thus fixed to the hydraulic cylinder 14 and is exposed to the hydraulic fluid within the cylinder 14. The pressure sensor 42 is arranged to generate an electronic signal which is representative of the detected hydraulic pressure (i.e. the pressure of the hydraulic fluid). Thus, the hydraulic pressure within the cylinder 14 can be determined from the electronic signal generated by the pressure sensor 42. The inclination sensor 44 is mounted to the outer surface of the hydraulic cylinder 14 and is positioned such that it can measure the fore-aft (i.e. forwards/backwards) inclination of the hydraulic cylinder 14 in a plane perpendicular to the pivot axis 30. The inclination sensor 44 is arranged to generate an electronic signal which is representative of the inclination angle α. In this embodiment, with the truck chassis 6 horizontal, the inclination angle α of the hydraulic cylinder 14 can be determined from the electronic signal generated by the inclination sensor 44. Due to the fixed relationship between the inclination angle and the tip angle, the electronic signal generated by the inclination sensor 44 also relates to the tip angle θ (i.e. with the truck chassis 6 horizontal the tip angle θ can be determined from the electronic signal generated by the inclination sensor).

The speed warning system 40 further comprises a vehicle speed monitoring module 52, a tipper body monitoring module 54, an excessive speed determining module 56, a cylinder control module 58 and a display 60. The vehicle speed monitoring module 52 is arranged to be connected to a controller of the engine of the tipper truck (not shown), for example via the CAN bus. The speed monitoring module 52 is configured to receive (or obtain) a speed signal relating to the speed of the tipper vehicle 1. The pressure sensor 42 and the inclination sensor 44 are connected to tipper body monitoring module 54 by appropriate cabling such that the monitoring module 54 can receive the electronic signals generated by the sensors 42, 44. It should be appreciated that in other embodiments the sensors 42, 44 could be wirelessly connected to the tipper body monitoring module 54. Further, the vehicle speed monitoring module 52 could be wirelessly connected to the engine controller. The excessive speed determining module 56 is connected to the vehicle speed monitoring module 52 and the tipper body monitoring module 54 and receives the speed signal, the pressure signal and the inclination signal monitored by these modules 52, 56. The excessive speed monitoring module 56 is configured to determine whether the current speed of the tipper vehicle 1 (represented by the speed signal) is excessive, based on the load within the tipper body 8 (represented by the pressure signal) and the tip angle of the tipper body 8 (represented by the inclination signal). In this embodiment, the speed monitoring module 56 is configured to determine a maximum permissible speed based on the current load and tip angle, and is configured to determine that the current vehicle speed is excessive if it exceeds this maximum permissible speed. However, it should be appreciated that in other embodiments other methods could be used to determine that the speed is excessive. The cylinder control module 58 is coupled to the hydraulic actuation system 20 of the tipper truck 1 (via the pilot system) so that it can automatically actuate the hydraulic cylinder 14 to return the tipper body 8 to a resting position if the excessive speed determining module 56 determines that the vehicle speed is excessive. The display 60 is connected to the excessive speed determining module 56 and is configured to display an alert if the speed determining module 56 determines that the vehicle speed is excessive. The display 60 is an LCD screen configured to display a visual alert, and a sounder is also provided to generate an audible alert. In this embodiment the display 60 is installed in the dashboard of the tractor 2 such that it is easily visible by an operator. However, in other embodiments it could be located externally, or it could be in the form of a wireless hand-held device (e.g. a smartphone or a tablet). If the display 60 is provided by a portable wireless device, such as a smartphone or tablet, it could also incorporate the various modules 52, 54, 56, and could communicate wirelessly with the engine controller (not shown) and the sensors 42, 44. It should be appreciated that other displays, such as one or more LEDs could be used to provide a warning.

Figure 4:
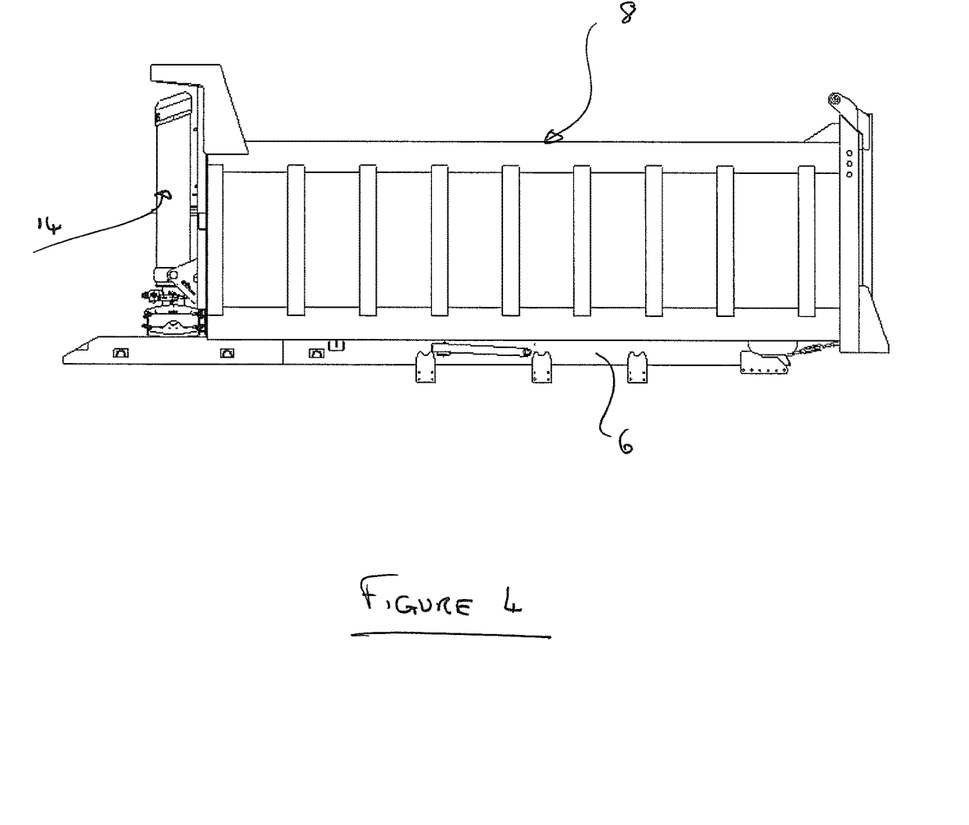
FIG. 4 schematically shows a tipper truck with the tipper body in a resting position.
Figure 5:
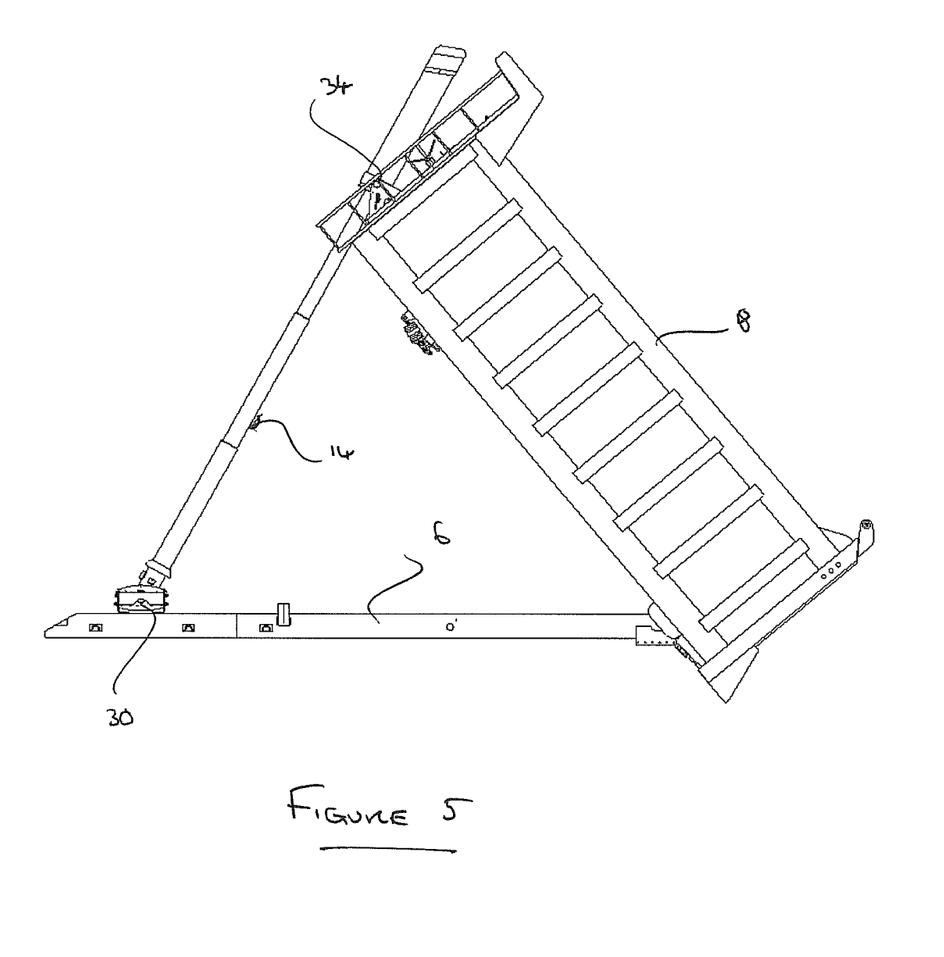
FIG. 5 schematically shows a tipper truck with the tipper body in a fully tipped position.

The operation of the tipper will now be described with reference to FIGS. 4 and 5.

Before commencing a tipping operation the tipper truck 1 is driven to a location where the chassis 6 is substantially horizontal. Initially, the tipper body 8 containing a load 16 (such as sand) is in a resting position (FIG. 4). In the resting position of the tipper body 8 it rests on the chassis 6 of the trailer 4 such that the load is transferred directly to the chassis 6. Therefore, in the resting position no load is transferred through the hydraulic cylinder 14. In order to commence a tipping operation in which the load 16 within the tipper body 8 is emptied, an operator uses a control lever (not shown) of the hydraulic actuation system 20 to extend the hydraulic cylinder 14. This causes the tipper body 8 to be pivoted about the axis 10 from the resting position towards a fully tipped position (FIG. 5). In this embodiment, the fully tipped position is approximately a 50° tip angle with respect to the horizontal chassis 6. Since the rear door 12 is unlocked during the tipping operation, as the hydraulic cylinder 14 is extended, the load 16 is emptied onto the ground. In order to empty the load onto the ground, the operator may need to drive the tipper truck 1 forward slowly.

As soon as the tipper body 8 is pivoted away from the chassis 6 load is transferred through the hydraulic cylinder 14 which pressurises the hydraulic fluid within the cylinder 14. The pressure is at its highest during the initial phase of the tipping operation. As the tip angle of the tipper body 8 increases, the pressure decreases as the load 16 is emptied onto the ground. The pressure also decreases as the centre of gravity of the tipper body 8 and load 16 moves closer to the rear tipper axis 10, and as the inclination angle of the hydraulic cylinder 14 decreases. It should be noted that there may be step changes in the pressure (although not the force) if the cylinder 14 is a telescopic (multi-stage) cylinder. As the hydraulic cylinder 14 extends the tip angle of the tipper body 8 increases and the inclination angle of the hydraulic cylinder 14 decreases.

The vehicle speed monitoring module 52 continuously monitors a speed signal generated by the engine controller relating to the speed of the vehicle. Simultaneously the tipper body monitoring module 54 continuously monitors both the value of the pressure signal generated by the pressure sensor 42 and the value of the inclination signal generated by the inclination sensor 44. The angular positional signal is generated by measuring the fore-aft inclination of the cylinder 14, but due to the fixed relationship between the cylinder 14 and the tipper body 8, it also relates to the tip angle (i.e. the angular position of the tipper body 8). The excessive speed determining module 56 receives the monitored signals and, based on the values of the pressure signal and the inclination signal, calculates a maximum permissible speed. The maximum permissible speed calculated depends on both the pressure within the hydraulic cylinder and the tip angle of the tipper body 8. The excessive speed determining module 56 then determines whether the current speed, as represented by the speed signal, exceeds the maximum permissible speed. The maximum permissible speed is dynamically calculated and is a function of both the hydraulic cylinder pressure and the tip angle. For example, the higher the hydraulic pressure and the higher the tip angle, the lower the calculated maximum permissible speed. A high hydraulic pressure with a low tip angle may generate a higher maximum permissible speed. The display 60 may display the maximum permissible speed to the driver so that the driver is aware of the maximum speed at which the tipper vehicle can be driven. If it is determined that the current vehicle speed is excessive, the display 60 generates a visual alert and an audible alert is also generated. Further, in response to determining that the vehicle speed is excessive, the cylinder control module 58 communicates with the hydraulic actuation system 20 to automatically actuate the hydraulic cylinder 14 to return the tipper body 8 to the resting position (FIG. 4). These measures alert the operator to a problem, allowing the operator to reduce the driving speed. Returning the tipper body 8 to the resting position minimises any risk of the tipper truck 1 toppling.

The speed warning system 40 may make various assumptions in order to be able to determine if the vehicle speed is excessive. For example, the excessive speed determining module 56 may assume that the chassis 6 is horizontal. If the chassis 6 is not horizontal, excessive speed determining module 56 may be able to determine the inclination angle of the chassis 6, and may use this value to correct for any inclination. For example, the chassis 6 may be provided with an inclination sensor arranged to generate a signal indicative of the inclination angle. In other arrangements, the signal generated by the inclination sensor 44 attached to the hydraulic cylinder 14 may be used to determine the inclination angle of the chassis 6.

Figure 6:
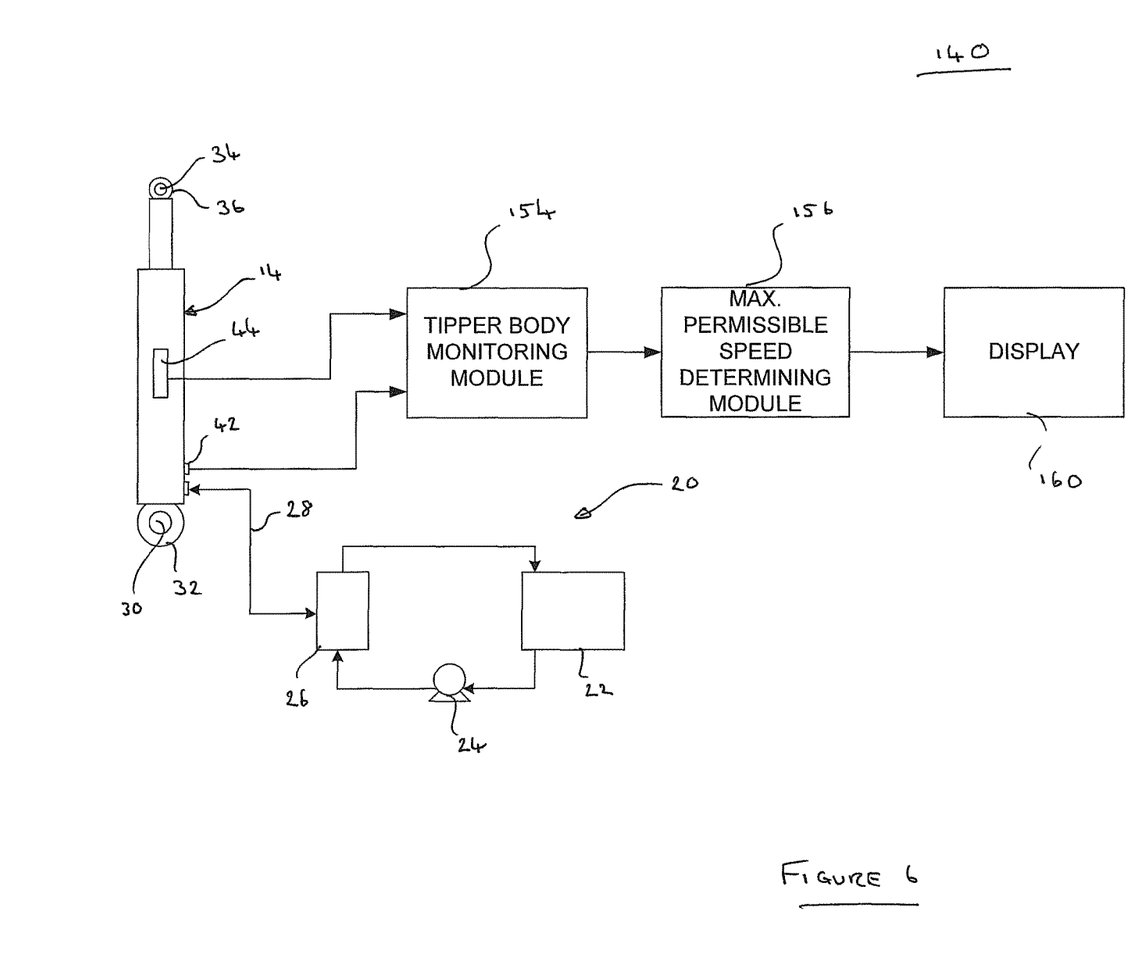
FIG. 6 schematically shows a second embodiment of a speed warning system for the tipper truck.

FIG. 6 shows a second embodiment of a speed warning system 140 which is similar to the first embodiment. However, in this embodiment there is no vehicle speed monitoring module and no cylinder control module. Further, instead of an excessive speed determining module there is a maximum permissible vehicle speed determining module 156. The maximum speed determining module 156 receives the monitored pressure and angular position signals from the tipper body monitoring module 154. Based on the values of the pressure signal and the inclination signal, the maximum speed determining module 156 calculates a maximum permissible speed. As for the first embodiment, the maximum permissible speed is dynamically calculated and depends on both the pressure within the hydraulic cylinder and the tip angle of the tipper body 8 (although in other embodiments it could be based on one value only). For example, the higher the hydraulic pressure and the higher the tip angle, the lower the calculated maximum permissible speed. A high hydraulic pressure with a low tip angle may generate a higher maximum permissible speed. The maximum permissible speed is then displayed by the display 60 (in mph or km/h, for example) so that the driver is aware of the maximum speed at which the tipper vehicle can be driven.

It has been described above that the angular positional parameter is generated by an inclination sensor attached to the hydraulic cylinder 14. However, other suitable sensors could be used. For example, an inclination sensor could be attached to the tipper body 8 to measure the angular position of the tipper body. Further, a rotary position sensor could be used to measure the amount of rotation at either the pivot axis 10 of the tipper body 8, or the lower or upper pivot axes 30, 34 of the hydraulic cylinder 14. The signals generated by these sensors can all be related to the angular position of the tipper body (either with respect to the chassis 6 or horizontal). Further, a linear position sensor could be used to monitor the length of the hydraulic cylinder 14. Such a sensor could include a Hall effect sensor, for example. The signal generated by the linear position sensor could again be used to determine the angular position of the tipper body 8. In another arrangement, a distance sensor could be provided to measure the vertical distance between the frame and the lower front edge (i.e. the raised edge) of the tipper body 8. Such a sensor would generate an angular positional parameter as the output of the sensor relates to the angular position of the tipper body 8.

As opposed to providing the pressure sensor 42 in a port in the wall of the hydraulic cylinder 14, the pressure sensor could be provided in the fluid line 28 connecting the valve assembly 26 to the cylinder 14. In essence, the pressure sensor 42 could be provided at any suitable position in the hydraulic system where it can detect the hydraulic pressure within the cylinder 14.

In the embodiment described above the speed signal is obtained from the main engine management system of the tipper truck 1. However, the speed signal could be obtained by using a motion sensor such as an accelerometer or an inertial measurement unit (IMU) mounted to a part of the tipper vehicle, or a satellite navigation receiver such as a GPS receiver mounted to a part of the vehicle. For example, a motion sensor could be mounted to the hydraulic cylinder and the signal generated by this sensor could be output to the vehicle speed monitoring module. Further, in another embodiment a drive shaft speed sensor could be provided to measure rotational speed of the drive shaft. This could be in the form of an inductive sensor monitoring the rotation of the drive shaft to which a magnet is attached. The output of the drive shaft speed sensor could be used as a vehicle speed parameter. Of course, in other embodiments another component of the vehicle transmission system could be monitored by the vehicle speed monitoring module 52. Further, is some embodiments, the vehicle speed is not monitored or measured at all, and only the maximum permissible vehicle speed is displayed.

It has been described that the excessive speed determining module 56, where present, determines if the speed is excessive by calculating a dynamic maximum permissible speed and checking if the current speed exceeds this value. However, other methods of determining that the speed is excessive could be used. For example, a look-up table or database could be provided correlating various inclination angles, hydraulic pressures and maximum speeds. The maximum permissible speed could be obtained from such a database and it could be checked if the current speed exceeds this value. Of course, other appropriate methods could also be used.

In one embodiment the speed warning system 40 could be incorporated into the engine management system so that the system 40 can actually limits the speed of the vehicle to the maximum permissible speed. In other embodiments the speed warning system 40 could prevent any movement of the vehicle if the speed is excessive.

In the above described embodiments it has been described that a maximum speed is determined and the current speed is compared with this maximum. Although the speed in mph or km/h could be calculated, other values representing speed could also be used.

Figure 7:
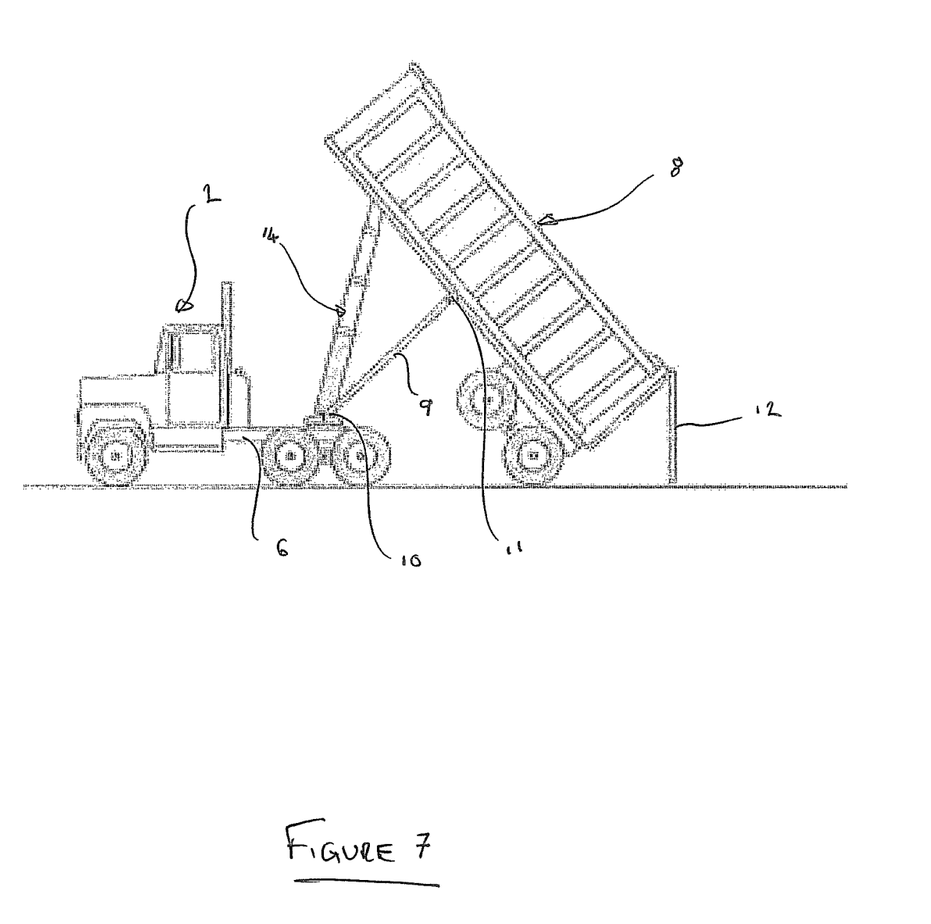
FIG. 7 schematically shows an alternative tipper truck.

It should be appreciated that the system could be used with any suitable type of tipper truck in which a tipper body 8 can be pivoted or moved by a hydraulic cylinder. For example, as shown in FIG. 7, the tipper truck 1 may comprises a tractor 2 having a frame 6 with a hydraulic cylinder 14 connected between the frame 6 and the tipper body 8. The tipper truck 14 further comprises a drawbar 11 that is pivotably connected at a first end to the frame 6 at a first pivot axis 10 and at a second end to the tipper body 8 at a second pivot axis 11. In order to pivot the tipper body 8 from a resting position (not shown) to the fully tipped position (FIG. 7), the hydraulic cylinder 14 is extended which causes the tipper body 8 to pivot clockwise (in FIG. 7) with respect to the frame 6 about the pivot axis 10, and with respect to the drawbar 9 about the pivot axis 11. It should also be appreciated that in order to measure the angular position (i.e. tip angle) of the tipper body 8 the inclination angle of the drawbar 9 could be measured since there is a fixed relationship between this angle and the tip angle (and the inclination angle of the hydraulic cylinder 14).

The speed warning system 40 may be one of many intelligent systems that the tipper truck 1 is provided with and could therefore be combined with any suitable system for providing information regarding the tipper vehicle and/or the load carried by the tipper body. If multiple intelligent systems are provided, they may share the same display or processors, for example.

Some aspects of the above-described apparatus, system and methods, may be embodied as machine readable instructions such as processor control code, for example on a non-volatile carrier medium such as a disk, CD- or DVD-ROM, programmed memory such as read only memory (Firmware), or on a data carrier such as an optical or electrical signal carrier. For some applications, embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog TM or VHDL (Very high speed integrated circuit Hardware Description Language). The code may be distributed between a plurality of coupled components in communication with one another. Where appropriate, embodiments may also be implemented using code running on a field-(re)programmable analogue array or similar device in order to configure analogue hardware.

For the avoidance of doubt, the present disclosure extends to the subject matter recited in the following numbered paragraphs or 'paras':

1. A method of operating a tipper vehicle, the tipper vehicle comprising a tipper body pivotably moveable with respect to a frame with a hydraulic cylinder disposed therebetween and actuatable to pivot the tipper body, the method comprising:
   monitoring at least one of (i) a pressure parameter relating to the hydraulic pressure within the hydraulic cylinder and (ii) an angular positional parameter relating to the angular position of the tipper body;

determining a maximum permissible vehicle speed based on at least one of the monitored (i) pressure parameter and (ii) angular positional parameter; and
displaying the maximum permissible vehicle speed.
2. A method according to para 1, comprising:
monitoring both the pressure parameter and the angular positional parameter, and
determining the maximum permissible vehicle speed based on at least the monitored pressure parameter and angular positional parameter.
3. A method according to para 1 or 2, wherein the pressure parameter is generated by a pressure sensor which measures the hydraulic pressure within the hydraulic cylinder.
4. A method according to para 3, wherein the pressure sensor is mounted to the hydraulic cylinder.
5. A method according to any preceding para, wherein the angular positional parameter is generated by an inclination sensor.
6. A method according to para 5, wherein the inclination sensor measures the inclination of the hydraulic cylinder.
7. A method according to para 6, wherein the inclination sensor is mounted to the hydraulic cylinder.
8. A method according to para 5, wherein the inclination sensor measures the inclination of the tipper body.
9. A method according to para 8, wherein the inclination sensor is mounted to the tipper body.
10. A method according to any of paras 1-4, wherein the angular positional parameter is generated by a rotary position sensor.
11. A method according to para 10, wherein the rotary position sensor measures the angular position of the hydraulic cylinder about a pivot axis of the hydraulic cylinder.
12. A method according to para 10, wherein the rotary position sensor measures the angular position of the tipper body about the pivot axis of the hydraulic cylinder.
13. A method according to any preceding para, wherein determining the maximum permissible vehicle speed comprises utilising an algorithm.
14. A method according to any preceding para, further comprising receiving the vehicle speed.
15. A method according to para 14, further comprising generating an alert if it is determined that the received vehicle speed is greater than the determined maximum permissible vehicle speed.
16. A method according to para 14 or 15, wherein the vehicle speed is received from an engine controller of the vehicle.
17. A method according to any of paras 14-16, wherein the vehicle speed is determined using at least one of:
a motion sensor, such as an accelerometer or an inertial measurement unit;
a satellite navigation receiver; and
a drive shaft speed senor which measures the rotational speed of a drive shaft of the vehicle.
18. A method according to para 17, wherein the motion sensor is mounted to the hydraulic cylinder.
19. A method according to any of paras 15-18, wherein the alert comprises a visual and/or an audible alert.
20. A method according to any of paras 14-19, further comprising lowering the tipper body towards the resting position if it is determined that the vehicle speed is greater than the maximum permissible vehicle speed.
21. A system for a tipper vehicle, the tipper vehicle comprising a tipper body pivotably moveable with respect to a frame with a hydraulic cylinder disposed therebetween and actuatable to pivot the tipper body, the system comprising:
a tipper body monitoring module arranged to monitor at least one of (i) a pressure parameter relating to the hydraulic pressure within the hydraulic cylinder and (ii) an angular positional parameter relating to the angular position of the tipper body;
a maximum permissible vehicle speed determining module arranged to determine the maximum permissible vehicle speed based on at least one of the monitored (i) pressure parameter and (ii) angular positional parameter; and
a display arranged to display the maximum permissible vehicle speed.
22. A system according to para 21, wherein the tipper body monitoring module is arranged to monitor both the pressure parameter and the angular positional parameter, and wherein the maximum permissible vehicle speed determining module is arranged to determine the maximum permissible vehicle speed based on at least the monitored pressure parameter and angular positional parameter.
23. A system according to para 21 or 22, further comprising a pressure sensor arranged to measure the hydraulic pressure within the hydraulic cylinder and arranged to generate the pressure parameter.
24. A system according to any of paras 21-23, further comprising an inclination sensor arranged to generate the angular positional parameter.
25. A system according to para 24, wherein the inclination sensor is arranged to measure the inclination of the hydraulic cylinder.
26. A system according to para 24, wherein the inclination sensor is arranged to measure the inclination of the tipper body.
27. A system according to any of paras 21-23, further comprising a rotary position sensor arranged to generate the angular positional parameter.
28. A system according to para 27, wherein the rotary position sensor is arranged to measure the angular position of the hydraulic cylinder about a pivot axis of the hydraulic cylinder.
29. A system according to para 27, wherein the rotary position sensor is arranged to measure the angular position of the tipper body about the pivot axis of the hydraulic cylinder.
30. A system according to any of paras 21-31, wherein the maximum permissible vehicle speed determining module is arranged to determine the maximum permissible vehicle speed utilising an algorithm.
31. A system according to any of paras 21-30, further comprising a vehicle speed monitoring module is arranged to monitor the vehicle speed.
32. A system according to para 31, further comprising an alert generator arranged to generate an alert if it is determined that the vehicle speed is greater than the determined maximum permissible vehicle speed.
33. A system according to para 31 or 32, wherein the vehicle speed monitoring module is arranged to be connected to an engine controller of the vehicle such that it can receive the vehicle speed from the engine controller.
34. A system according to any of paras 31-33, wherein the vehicle speed monitoring module is arranged to determine the vehicle speed using at least one of:
a motion sensor, such as an accelerometer or an inertial measurement unit;
a satellite navigation receiver; and
a drive shaft speed senor arranged to measure the rotational speed of a drive shaft of the vehicle.

15

35. A system according to any of paras 32-34, wherein the alert generator comprises a visual and/or an audible alert generator.
36. A system according to any of paras 31-35, further comprising a hydraulic cylinder control module arranged to actuate the hydraulic cylinder to lower the tipper body towards the resting position if it is determined that the vehicle speed is greater than the maximum permissible vehicle speed.
37. A tipper vehicle comprising:
a tipper body pivotably moveable with respect to a frame;
a hydraulic cylinder disposed between the frame and the tipper body and actuatable to pivot the tipper body; and
a system in accordance with any of paras 21-36.
38. A tipper vehicle according to para 37 when appended to para 23, wherein the pressure sensor is mounted to the hydraulic cylinder.
39. A tipper vehicle according to para 37 or 38 when appended to para 25, wherein the inclination sensor is mounted to the hydraulic cylinder.
40. A tipper vehicle according to any of paras 37-39 when appended to para 26, wherein the inclination sensor is mounted to the tipper body.
41. A tipper vehicle according to any of paras 37-40 when appended to para 34, wherein the motion sensor is mounted to the hydraulic cylinder.
42. A hydraulic cylinder assembly comprising:
a hydraulic cylinder having at least one pivot axis perpendicular to the longitudinal axis of the cylinder; and
at least one inclination sensor coupled to the hydraulic cylinder such that it is capable of generating a fore-aft inclination parameter relating to the inclination of the cylinder in a plane perpendicular to the pivot axis.
43. A hydraulic cylinder assembly according to para 42, further comprising a motion sensor, such as an accelerometer or an inertial measurement unit, coupled to the hydraulic cylinder and capable of generating a speed parameter.
44. A hydraulic cylinder assembly comprising:
a hydraulic cylinder having at least one pivot axis perpendicular to the longitudinal axis of the cylinder; and
a motion sensor, such as an accelerometer or an inertial measurement unit, coupled to the hydraulic cylinder and capable of generating a speed parameter.
45. A hydraulic cylinder assembly according to para 44, further comprising at least one inclination sensor coupled to the hydraulic cylinder such that it is capable of generating a fore-aft inclination parameter relating to the inclination of the cylinder in a plane perpendicular to the pivot axis.
46. A hydraulic cylinder assembly according to any of paras 42-45, wherein at least one end of the hydraulic cylinder is provided with an eye which defines the pivot axis.
47. A hydraulic cylinder assembly according to any of paras 42-46, further comprising a pressure sensor coupled to the hydraulic cylinder such that it is capable of generating a pressure parameter relating to the hydraulic pressure within the hydraulic cylinder.

What is claimed is:
1. A method of operating a tipper vehicle, the tipper vehicle comprising a tipper body pivotably moveable with respect to a frame with a hydraulic cylinder disposed there between and actuatable to pivot the tipper body, the method comprising:
monitoring at least one of (i) a pressure parameter relating to the hydraulic pressure within the hydraulic cylinder and (ii) an angular positional parameter relating to the angular position of the tipper body;
determining a maximum permissible vehicle speed based on at least one of the monitored (i) pressure parameter and (ii) angular positional parameter; and
displaying the maximum permissible vehicle speed.
2. The method according to claim 1, comprising:
monitoring both the pressure parameter and the angular positional parameter, and
determining the maximum permissible vehicle speed based on at least the monitored pressure parameter and angular positional parameter, wherein the pressure parameter is generated by a pressure sensor which measures the hydraulic pressure within the hydraulic cylinder and wherein the pressure sensor is mounted to the hydraulic cylinder.
3. The method according to claim 1, wherein the angular positional parameter is generated by an inclination sensor, wherein the inclination sensor:
a) measures the inclination of the hydraulic cylinder, and is mounted to the hydraulic cylinder;
b) measures the inclination of the tipper body, and is mounted to the tipper body.
4. The method according to claim 1, wherein the angular positional parameter is generated by a rotary position sensor, wherein the rotary position sensor measures the angular position of:
a) the hydraulic cylinder about a pivot axis of the hydraulic cylinder; or
b) the tipper body about the pivot axis of the hydraulic cylinder.
5. The method according to claim 1, further comprising receiving the vehicle speed from an engine controller of the vehicle.
6. The method according to claim 5, further comprising one or more of:
a) generating an alert if it is determined that the received vehicle speed is greater than the determined maximum permissible vehicle speed; and
b) lowering the tipper body towards the resting position if it is determined that the vehicle speed is greater than the maximum permissible vehicle speed.
7. A system for a tipper vehicle, the tipper vehicle comprising a tipper body pivotably moveable with respect to a frame with a hydraulic cylinder disposed therebetween and actuatable to pivot the tipper body, the system comprising:
a tipper body monitoring module arranged to monitor at least one of (i) a pressure parameter relating to the hydraulic pressure within the hydraulic cylinder and (ii) an angular positional parameter relating to the angular position of the tipper body;
a maximum permissible vehicle speed determining module arranged to determine the maximum permissible vehicle speed based on at least one of the monitored (i) pressure parameter and (ii) angular positional parameter; and
a display arranged to display the maximum permissible vehicle speed.
8. The system according to claim 7, wherein the tipper body monitoring module is arranged to monitor both the pressure parameter and the angular positional parameter, and wherein the maximum permissible vehicle speed determining module is arranged to determine the maximum permissible vehicle speed based on at least the monitored pressure parameter and angular positional parameter.
9. The system according to claim 7, further comprising a pressure sensor arranged to measure the hydraulic pressure within the hydraulic cylinder and arranged to generate the pressure parameter, further comprising an inclination sensor arranged to generate the angular positional parameter, and further wherein the inclination sensor is arranged to measure the inclination of the hydraulic cylinder or the tipper body.

10. The system according to claim 7, further comprising a rotary position sensor arranged to generate the angular positional parameter, wherein the rotary position sensor is arranged to measure the angular position of:
the hydraulic cylinder about a pivot axis of the hydraulic cylinder; or
the tipper body about the pivot axis of the hydraulic cylinder.

11. The system according to claim 7, further comprising a vehicle speed monitoring module is arranged to monitor the vehicle speed, wherein the vehicle speed monitoring module is arranged to be connected to an engine controller of the vehicle such that it can receive the vehicle speed from the engine controller, and further comprising an alert generator arranged to generate an alert if it is determined that the vehicle speed is greater than the determined maximum permissible vehicle speed.

12. The system according to claim 11, further comprising a hydraulic cylinder control module arranged to actuate the hydraulic cylinder to lower the tipper body towards the resting position if it is determined that the vehicle speed is greater than the maximum permissible vehicle speed.

13. A tipper vehicle comprising
the system in accordance with claim 7.

14. The tipper vehicle according to claim 13, wherein:
a) a pressure sensor is mounted to the hydraulic cylinder; and/or
b) an inclination sensor is mounted to one or more of the hydraulic cylinder or the tipper body.

* * * * *